United States Patent
Dateki

(10) Patent No.: US 9,344,851 B2
(45) Date of Patent: May 17, 2016

(54) SPEED ESTIMATION METHOD IN A MOBILE TERMINAL ACCORDING TO A RESULT OF DETERMINING A GIVEN SATISFYING CONDITION

(71) Applicant: FUJITSU LIMITED, Kawasaki-shi, Kanagawa (JP)

(72) Inventor: Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/309,555

(22) Filed: Jun. 19, 2014

(65) Prior Publication Data
US 2015/0005001 A1    Jan. 1, 2015

(30) Foreign Application Priority Data
Jun. 26, 2013    (JP) .................................. 2013-133715

(51) Int. Cl.
*H04W 24/00*    (2009.01)
*H04W 4/02*    (2009.01)
*G01S 11/10*    (2006.01)

(52) U.S. Cl.
CPC ............... *H04W 4/027* (2013.01); *G01S 11/10* (2013.01)

(58) Field of Classification Search
CPC ... H04W 36/32; H04W 64/006; H04W 88/06; H04W 4/027; H04W 24/08; H04W 36/245; H04W 36/30; H04W 48/16; H04W 4/046; H04W 60/00; H04W 64/00; H04W 24/00; H04W 36/18; H04W 48/18; H04W 4/02

USPC ............. 455/517, 441, 574, 456.1, 442, 561, 455/425, 451, 67.11, 513, 435.2, 553.1, 455/450, 550.1, 328, 436, 504, 63.1, 113
See application file for complete search history.

(56) References Cited

U.S. PATENT DOCUMENTS

| | | | |
|---|---|---|---|
| 2004/0097197 A1* | 5/2004 | Juncker et al. ............. | 455/67.11 |
| 2005/0118960 A1 | 6/2005 | Miyazaki | |
| 2006/0172704 A1 | 8/2006 | Nishio et al. | |
| 2006/0209669 A1 | 9/2006 | Nishio | |
| 2012/0094679 A1* | 4/2012 | Rao ............................... | 455/450 |
| 2012/0157101 A1* | 6/2012 | Uemura et al. ............... | 455/436 |
| 2012/0281628 A1* | 11/2012 | Park et al. ..................... | 370/328 |
| 2012/0289274 A1* | 11/2012 | Matsuo et al. ................ | 455/509 |

FOREIGN PATENT DOCUMENTS

| | | |
|---|---|---|
| JP | 2010-11494 A | 1/2010 |
| JP | 2010-38825 A | 2/2010 |
| JP | 2010-98368 A | 4/2010 |
| JP | 2012-44492 A | 3/2012 |
| WO | WO 2004/068749 A1 | 8/2004 |
| WO | WO 2005/020488 A1 | 3/2005 |

* cited by examiner

*Primary Examiner* — Martin Mushambo
(74) *Attorney, Agent, or Firm* — Arent Fox LLP

(57) ABSTRACT

A mobile terminal includes: a memory; and a processor coupled to the memory and configured to: receive two or more of component carriers of different bandwidths, the component carriers being used for wireless communication performed by the mobile terminal, estimate one or more speeds of the mobile terminal based on respective one or more carriers among the two or more of the component carriers, determine whether the estimated one or more speeds satisfy a given condition, and estimate a speed of the mobile terminal according to a result of the determining.

8 Claims, 9 Drawing Sheets

SPEED ESTIMATION METHOD IN A MOBILE TERMINAL ACCORDING TO A RESULT OF DETERMINING A GIVEN SATISFYING CONDITION

CROSS-REFERENCE TO RELATED APPLICATION

This application is based upon and claims the benefit of priority of the prior Japanese Patent Application No. 2013433715, filed on Jun. 26, 2013, the entire contents of which are incorporated herein by reference.

FIELD

The embodiments discussed herein are related to techniques for estimating a speed of a mobile terminal.

BACKGROUND

In the 3rd Generation Partnership Project (3GPP), Long Term Evolution-Advanced (LTE-A), which is an expansion of LTE, is being investigated. In LTE-A, a technology called Carrier Aggregation (CA) is introduced. The carrier aggregation is a technology in which a communication channel between a terminal device and a base station is formed, for example, by integrating a plurality of frequency bands supported by LTE, so that the throughput of communication is improved.

An LTE-A standards-compliant mobile terminal performs communication using one component carrier or concurrently using a plurality of component carriers. Additionally, the number of component carriers and the center frequency of each component carrier are assumed to differ between adjacent base stations.

In wireless communication performed between a base station and a mobile terminal, it is important to estimate the moving speed of the mobile terminal.

There is known a technique in which the density in a time domain of pilot signals is controlled based on a speed estimation result (for example, Japanese Laid-open Patent Publication No. 2010-11494).

There is also known a technique of selecting channels when a terminal station device selects a predetermined number of channels with good reception quality from among channels arranged in a plurality of frequency bands, and notifies a base station device of measurement results of the reception quality of the selected channels (for example, Japanese Laid-open Patent Publication No. 2010-98368).

SUMMARY

According to an aspect of the invention, a mobile terminal includes; a memory; and a processor coupled to the memory and configured to: receive two or more of component carriers of different bandwidths, the component carriers being used for wireless communication performed by the mobile terminal, estimate one or more speeds of the mobile terminal based on respective one or more carriers among the two or more of the component carriers, determine whether the estimated one or more speeds satisfy a given condition, and estimate a speed of the mobile terminal according to a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed,

DESCRIPTION OF EMBODIMENTS

Hereinafter, embodiments of the present disclosure will be described with reference to the accompanying drawings.

While inventing the present embodiments, observations were made regarding a related art. Such observations include the following, for example.

In the related art, the moving speed of a mobile terminal is used for handover control in which, during communication, a wireless channel being used is switched to another channel having a frequency different from that of the wireless channel being used. If the moving speed of a mobile terminal and the frequency of a base station as the handover destination (hereinafter referred to as a "handover-destination base station") are known, the Doppler-shifted frequency of radio waves from the handover-destination base station may be calculated. Thereby, whether to permit handover may be determined in advance, and an action for tracking a Doppler-shifted frequency after handover may be taken.

However, when the speed is estimated in a mobile terminal that performs communication using a plurality of component carriers concurrently collected, the speed range that may be estimated with a certain accuracy differ for every component carrier. Therefore, it is not appropriate to estimate the speed using the same criterion.

Accordingly, one aspect of the present disclosure is for expanding the range in which the moving speed of a mobile terminal may be measured, in wireless communication involving carrier aggregation.

A mobile terminal of the present disclosure receives wireless signals from a base station using some component carriers of a plurality of component carriers (CC). Hereinafter, a "component carrier" is referred to as a "carrier".

First Embodiment

Figure 1:
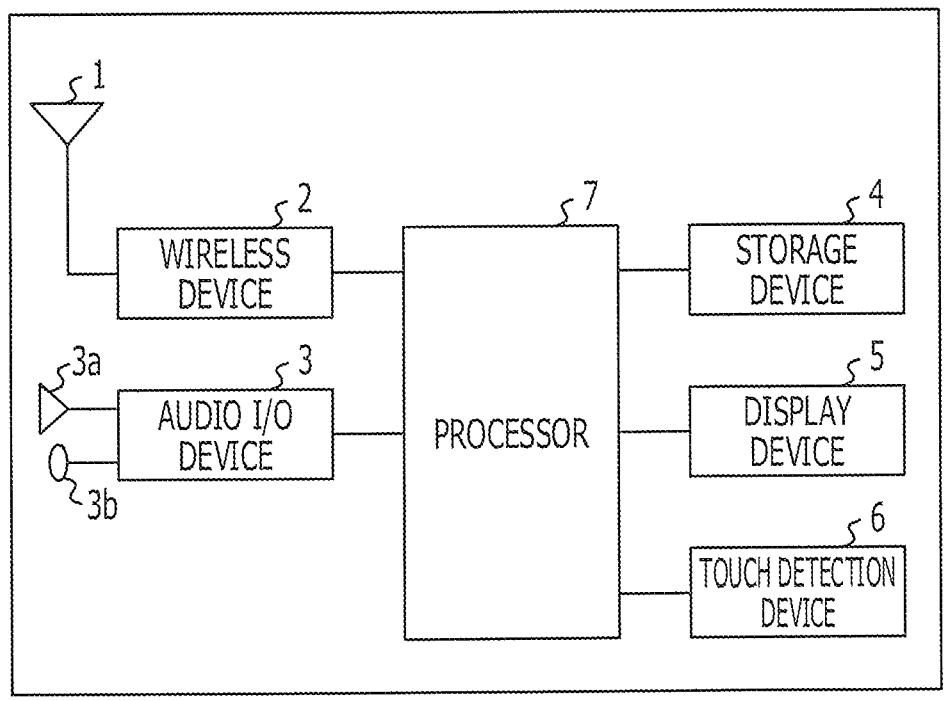
FIG. 1 illustrates an example of a configuration of a mobile terminal according to a first embodiment.

FIG. 1 illustrates an example of a configuration of a mobile terminal according to a first embodiment. The mobile terminal includes an antenna 1, a wireless device 2, an audio Input/Output (I/O) device 3, a storage device 4, a display device 5, a touch detection device 6, and a processor 7.

The antenna 1 is an example of a transmitter and receiver that sends and receives wireless signals such as various kinds of data. The wireless device 2 is an example of a communication central processing unit (CCPU) that performs wireless communication via the antenna 1.

The wireless device 2 receives signals via the antenna 1, and outputs the received signals to the processor 4. The wireless device 2 also sends signals generated by the processor 4 via the antenna 1.

The audio I/O device 3 is an example of an input-and-output interface that performs sound collection and sound output. For example, the audio I/O unit 3 applies audio processing to sound collected by a microphone 3a and applies audio processing to sound signals in wireless signals received via the wireless device 2, and outputs power of sound from a speaker 3b.

The storage device 4 is a storage device that stores data for performing various functions of a mobile terminal and various programs for performing various functions of the mobile terminal. Examples of the storage device 4 include a read only memory (ROM), a random access memory (RAM), a hard disk, and so on.

The display device 5 is an example of a display or a touch panel that displays a variety of information. For example, the display device 5 displays an operation screen of an application executed by the processor 7, information on sending and receiving, and so on.

The touch detection device 6 is an example of an interface for detecting information operated on the display device 5. Specifically, the touch detection device 6 detects information operated by a user on a touch panel, and outputs the detected information to the processor 7.

The processor 7 controls the entire mobile terminal using programs and data stored in a ROM and RAM that the storage device 4 has. Examples of the processor 7 include, for example, a central processing unit (CPU), and a micro processing unit (MPU).

Figure 2:
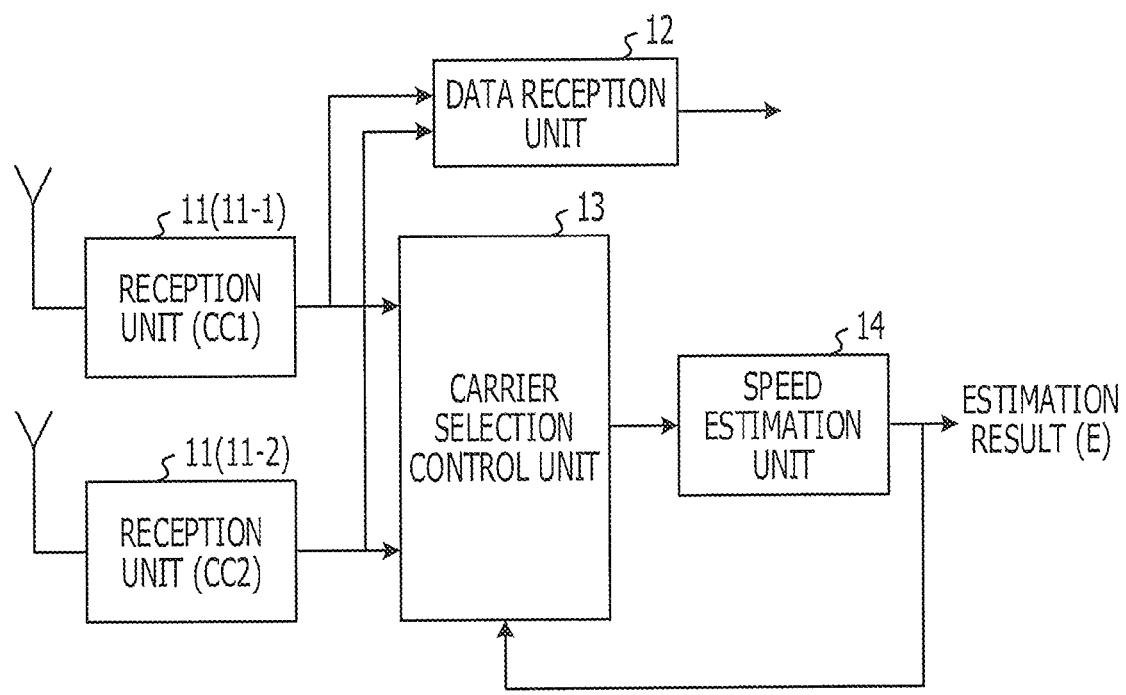
FIG. 2 is a block diagram illustrating functional blocks of a reception system of the mobile terminal according to the first embodiment.

FIG. 2 is a block diagram illustrating functional blocks of a reception system of the mobile terminal according to the first embodiment. The reception system of the mobile terminal includes reception units 11 (11-1) and 11 (11-2), a data reception unit 12, a carrier selection control unit 13, and a speed estimation unit 14.

The reception units 11 (11-1) and 11 (11-2) are functional units that receive a plurality of carriers having different center frequencies by using antennas, and each of the reception units 11 (11-1) and 11 (11-2) is implemented by the antenna 1, the wireless device 2, the storage device 4, and the processor 7. The reception unit 11 (11-1) performs down-conversion of a received carrier to convert the carrier to digital signals, and outputs reception signals to the data receiving unit 12 and to the carrier selection control unit 13. Also, the reception unit 11 (11-2) performs down-conversion of a received carrier to convert the carrier to digital signals, and outputs reception signals to the data receiving unit 12 and to the carrier selection control unit 13.

In the description given below, the reception unit 11 (11-1) is assumed to receive a first carrier having a center frequency F1, and the reception unit 11 (11-2) is assumed to receive a second carrier having a center frequency F2. The reception units 11 (11-1) and 11 (11-2) both have the same function, and either one of the reception units 11 (11-1) and 11 (11-2) is referred to as the reception unit 11. Note that it is assumed hereinafter that the center frequency F2 is higher than the center frequency F1.

The data reception unit 12 is a functional unit that processes data received by the reception units 11 (11-1) and 11 (11-2), and is implemented by the storage device 4 and the processor 7.

The carrier selection control unit 13 is a functional unit that selects a carrier to be used for speed estimation, based on a speed estimated by the speed estimation unit 14 described below, and is implemented by the storage device 4 and the processor 7. Then, the carrier selection control unit 13 outputs the reception signal of the selected carrier to the speed estimation unit 14.

The speed estimation unit 14 is a functional unit that performs speed estimation using reception signals of a carrier selected by the carrier selection control unit 13, and is implemented by the storage device 4 and the processor 7. Then, the speed estimation unit 14 outputs the result of the speed estimation to the carrier selection control unit 13. Note that the speed estimation unit 14 may perform a time frequency transformation, for example, a fast Fourier transform (FFT), to generate a subcarrier component, and may estimate the speed based on the result of calculation of a channel estimated value from a pilot signal.

Figure 3:
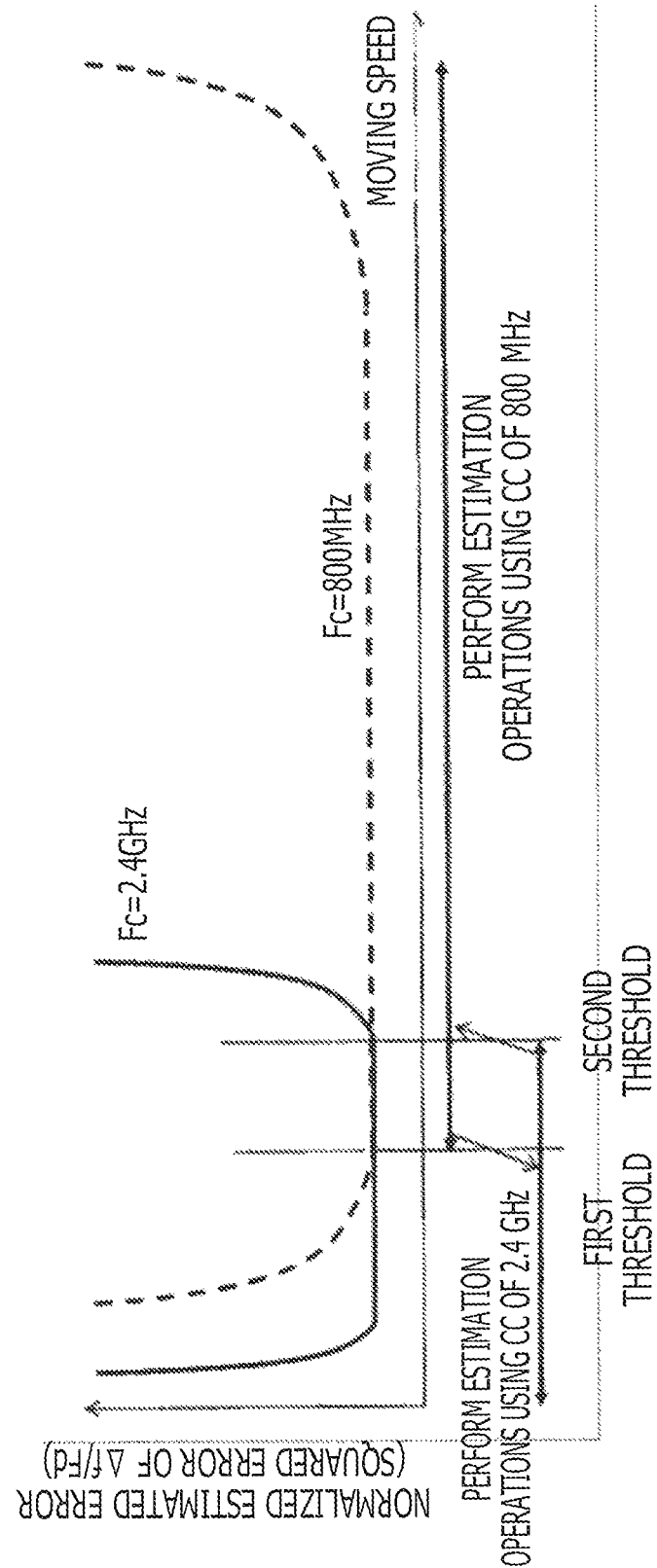
FIG. 3 is a graph illustrating the relationship, for a mobile terminal that performs communication using carriers having different center frequencies, between the moving speed of the mobile terminal and the normalized estimated error.

FIG. 3 is a graph illustrating the relationship, for a mobile terminal that performs communication using carriers having different center frequencies, between the moving speed of the mobile terminal and the normalized estimated error. In the graph of FIG. 3, the horizontal axis represents the moving speed, and the vertical axis represents the normalized estimated error. The term "normalized estimated error" refers to an error that is obtained by normalizing, for the moving speed of a mobile terminal, an error between the Doppler frequency and the estimation value thereof by the Doppler frequency.

Here, by way of example, in the case where the center frequencies are 2.4 GHz and 800 MHz, for a mobile terminal that performs communication using carriers having different center frequencies, the relationships between the moving speeds of the mobile terminal and the normalized estimated errors are described.

If the Doppler frequency, that is, the moving speed is attempted to be estimated using reception signals in a period of a section T at some time interval $\Delta T$, according to an approach using an FFT, the frequency spectrum after the FFT has a waveform that is obtained by sampling the spectrum with a bandwidth of $1/\Delta T$ at regular frequency intervals of $1/T$. From this, the frequency resolution of the obtained waveform is no more than $1/T$, and therefore it is difficult to detect a Doppler frequency smaller than this with good accuracy. Likewise, the spectrum may be acquired only within a range of the bandwidth of $1/\Delta T$, and therefore it is impossible to measure a Doppler frequency that exceeds $1/(2\Delta T)$. Although such limitations to a detection range and resolution properties correspond to the Doppler frequency, the Doppler frequency has a value proportional to the center frequency even with the same moving speed. Therefore, if the center frequency varies, the speed region influenced by the detection limitations and the resolution varies.

The broken line of FIG. 3 represents, for a mobile terminal that performs communication using a carrier having a center frequency of 800 MHz, the relationship between the moving speed of the mobile terminal and the normalized estimated error. Here, it is found that, in the mobile terminal that performs communication using the carrier having a center frequency of 800 MHz, the value of the normalized estimated error suddenly increases at a speed at which the moving speed of the mobile terminal is equal to or less than a first threshold. That is, it is indicated that when the moving speed of a mobile terminal is equal to or less than the first threshold, the accuracy of detecting the Doppler frequency decreases. In contrast, the solid line of FIG. 3 represents, for a mobile terminal that performs communication using a carrier having a center frequency of 2.4 GHz, the relationship between the moving speed of the mobile terminal and the normalized estimated error. Here, it is found that, in the mobile terminal that performs communication using the carrier having a center frequency of 2.4 GHz, the value of the normalized estimated error suddenly increases at a speed at which the moving speed of the mobile terminal is equal to or more than a second threshold. That is, it is indicated that when the moving speed of a mobile terminal is equal to or less than the second threshold, the accuracy of detecting the Doppler frequency decreases.

For example, a look at the moving speed of a mobile terminal equal to or less than the first threshold reveals that a mobile terminal that performs communication using a carrier having a center frequency of 2.4 GHz and a mobile terminal that performs communication using a carrier having a center frequency of 800 MHz have different values of normalized estimated error. It is thus found that the mobile terminal that performs communication using a carrier having a center frequency of 2.4 GHz is better in terms of accuracy of detecting the Doppler frequency than that using a carrier having a center frequency of 800 MHz.

Likewise, a look at the moving speed of a mobile terminal equal to or more than the second threshold reveals that a mobile terminal that performs communication using a carrier having a center frequency of 2.4 GHz and a mobile terminal that performs communication using a carrier having a center frequency of 800 MHz have different values of normalized estimated error. It is thus found that the mobile terminal that performs communication using a carrier having a center frequency of 800 MHz is better in terms of accuracy of detecting the Doppler frequency than that using a carrier having a center frequency of 2.4 GHz.

Here, the moving speed of a mobile terminal is described. The Doppler frequency is estimated from the time-varying amount of a received downlink pilot symbol, and the moving speed of a mobile terminal is calculated from the estimated Doppler frequency and the center frequency. The relationship between the movement speed V and the Doppler frequency Fd, the center frequency Fc, and the velocity of light c is given by expression (1).

$$V = c f_d / f_c \quad (1)$$

Accordingly, at speeds at which the moving speed of a mobile terminal is equal to or less than the first threshold, the mobile terminal that performs communication using a carrier having a center frequency of 2.4 GHz is better in terms of accuracy of detecting the moving speed than that using a carrier having a center frequency of 800 MHz. Also, at speeds at which the moving speed of a mobile terminal is equal to or more than the second threshold, the mobile terminal that performs communication using a carrier having a center frequency of 800 MHz is better in terms of accuracy of detecting the moving speed than that using a carrier having a center frequency of 2.4 GHz. That is, based on the result of comparison between a threshold in accordance with the frequency resolution at the center frequency of each carrier and the moving speed of a mobile terminal, the carrier selection control unit 13 makes a switch between carriers so as to provide advantages for detection of that moving speed. For example, when the moving speed of a mobile terminal is equal to or less than the first threshold, the moving speed of a mobile terminal is estimated using a carrier having a center frequency of 2.4 GHz. In contrast, when the moving speed of a mobile terminal is equal to or more than the second threshold, the moving speed of a mobile terminal is estimated using a carrier having a center frequency of 800 MHz. That is, when the moving speed of a mobile terminal is high, speed estimation is performed using a carrier having a low center frequency, whereas when the moving speed of a mobile terminal is low, speed estimation is performed using a carrier having a high center frequency.

Figure 4:
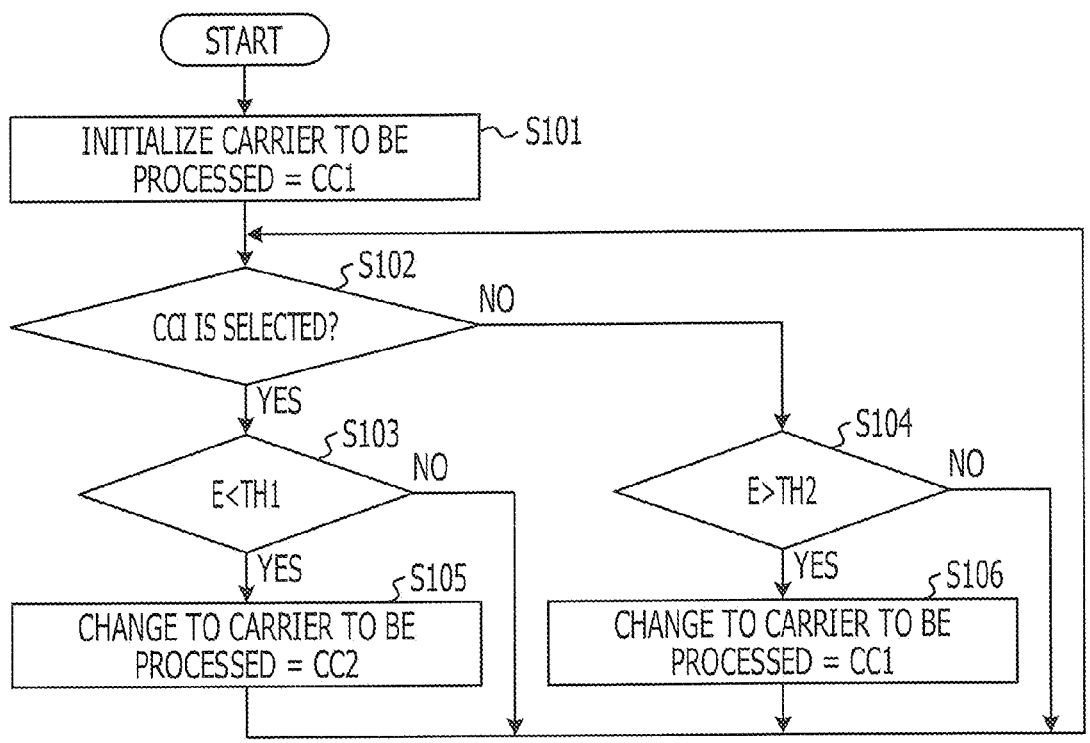
FIG. 4 is an example of a flowchart for explaining speed estimation operations of a reception system of the mobile terminal according to the first embodiment.

FIG. 4 is an example of a flowchart for explaining speed estimation operations of a reception system of a mobile terminal according to the first embodiment.

In step S101, the carrier selection control unit 13 initializes a setting as to whether to select either the first carrier or the second cattier. Under a setting condition, the carrier selection control unit 13 establishes a setting for selecting the first carrier. Note that the setting condition is not limited to this.

In step S102, the carrier selection control unit 13 determines whether the first carrier is set as a carrier to be processed. If the first carrier is set, the process proceeds to step S103 (step S102: YES). Otherwise, if the first carrier is not set (step S102: NO), the process proceeds to step S104.

In step S103, the carrier selection control unit 13 determines whether the result of speed estimation performed by the speed estimation unit 14 is smaller than the first threshold. Specifically, the carrier selection control unit 13 outputs a reception signal for the first carrier, of reception signals for the first carrier and the second carrier received by the reception units 11 (11-1) and 11 (11-2), to the speed estimation unit 14. The speed estimation unit 14 estimates a Doppler frequency from the time-varying amount of a pilot signal of that reception signal, and estimates the speed from the estimated Doppler frequency and the center frequency of the first carrier. Then, the speed estimation unit 14 outputs the result of that speed estimation to the carrier selection control unit 13. The carrier selection control unit 13 determines whether the result of that speed estimation is smaller than the first threshold that is set in association with the first carrier. If the result of speed estimation is smaller than the first threshold (step S103: YES), the process proceeds to step S105. Otherwise, if the result of speed estimation is not smaller than the first threshold (step S103: NO), the process proceeds to step S102.

In step S104, the carrier selection control unit 13 determines whether the result of speed estimation is larger than the second threshold. Specifically, the carrier selection control unit 13 outputs a reception signal for the second carrier, of reception signals for the first carrier and the second carrier received by the reception units 11 (11-1) and 11 (11-2), to the speed estimation unit 14. The speed estimation unit 14 estimates a Doppler frequency from the time-varying amount of a pilot signal of that reception signal, and estimates the speed from the estimated Doppler frequency and the center frequency of the second carrier. Then, the speed estimation unit 14 outputs the result of the performed speed estimation to the carrier selection control unit 13. The carrier selection control unit 13 determines whether the result of that speed estimation is larger than the second threshold that is set in association with the second carrier.

If the result of speed estimation is larger than the second threshold (step S104: YES), the process proceeds to step S106. Otherwise, if the result of speed estimation is not larger than the second threshold (step S104: NO), the process proceeds to step S102.

In step S105, the carrier selection control unit 13 changes the carrier to be processed to the second carrier. Note that, after completion of the operation of step S105, the process proceeds to step S102.

In step S106, the carrier selection control unit 13 changes the carrier to be processed to the first carrier. Note that, after completion of the operation of step S105, the process proceeds to step S102.

In this way, in a mobile terminal that performs wireless communication using a plurality of carriers of different bandwidths, two carriers are received, a speed is estimated based on a first carrier of the two carriers received, it is determined whether the estimated speed is larger than a speed threshold associated with the first carrier, and, according to the result of the determining, the speed is estimated based on a second carrier different from the first carrier, so that the moving speed of the mobile terminal may be measured with good accuracy even when communication is performed using two carriers. Thereby, the Doppler-shifted frequency of radio waves from a handover-destination base station may be calculated. That is, whether to permit handover may be determined in advance. Also, an action for tracking a Doppler-shifted frequency after handover may be taken.

Second Embodiment

Next, a second embodiment of the present disclosure will be described. In the first embodiment, when performing communication using two carriers, a mobile terminal selects a carrier suitable for speed estimation from the two carriers, and estimates the speed using that carrier. In the second embodiment, when performing communication using two or more carriers, a mobile terminal selects a carrier suitable for speed estimation from the two or more carriers, and estimates the speed of the mobile terminal using that carrier. Note that the configuration of the mobile terminal according to the second embodiment is the same as that of the mobile terminal according to the first embodiment illustrated in FIG. 1.

Figure 5:
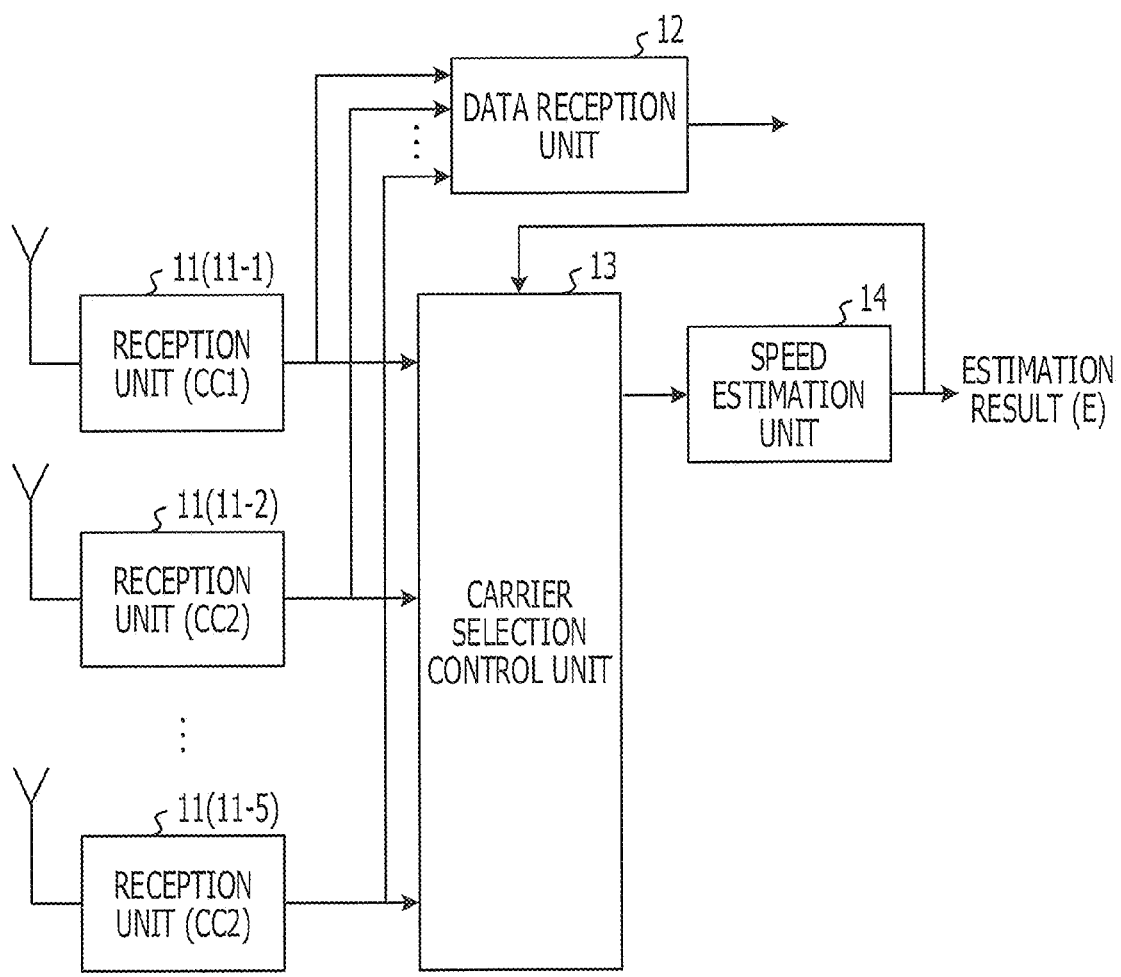
FIG. 5 is a block diagram illustrating functional blocks of a reception system of a mobile terminal according to a second embodiment.

FIG. 5 is a block diagram illustrating functional blocks of a reception system of the mobile terminal according to the second embodiment. The reception system of the mobile terminal according to the present disclosure includes reception units 11 (11-1), 11 (11-2), . . . 11 (11-5), the data reception unit 12, the carrier selection control unit 13, and the speed estimation unit 14.

The reception units 11 (11-1), 11 (11-2), . . . 11 (11-5) are functional units that receive a plurality of carriers having different center frequencies by using antennas, and each of the reception units 11 (11-1), 11 (11-2), . . . 11 (11-5) is implemented by the antenna 1, the wireless device 2, the storage device 4, and the processor 7. The reception unit 11 performs down-conversion of a received carrier to convert the carrier to digital signals, and outputs reception signals to the data receiving unit 12 and to the carrier selection control unit 13. The reception units 11 (11-1), 11 (11-2), . . . 11 (11-5) all have the same function, and any one of the reception units 11 (11-1), 11 (11-2), . . . 11 (11-5) is referred to as the reception unit 11. Note that the number of reception units 11 is not limited to this.

In the description given below, the reception unit 11 (11-1) receives a first carrier having a center frequency F1. Likewise, it is assumed that the reception unit 11 (11-2) receives a second carrier having a center frequency F2, the reception unit 11 (11-3) receives a third carrier having a center frequency F3, the reception unit 11 (11-4) receives a fourth carrier having a center frequency F4, and the reception unit 11 (11-5) receives a fifth carrier having a center frequency F5. Also, it is assumed that the center frequency decreases in the order of F5, F4, F3, F2, and F1.

The data reception unit 12 is a functional unit that processes data received by each of the reception units 11, and is implemented by the storage device 4 and the processor 7.

The carrier selection control unit 13 is a functional unit that selects a carrier to be used for speed estimation, based on a speed estimated by the speed estimation unit 14 described below, and is implemented by the storage device 4 and the processor 7.

The speed estimation unit 14 is a functional unit that performs speed estimation using reception signals for a carrier selected by the carrier selection control unit 13, and is implemented by the storage device 4 and the processor 7. Then, the speed estimation unit 14 outputs the result of the speed estimation to the carrier selection control unit 13. Note that the speed estimation unit 14 may perform a time frequency transformation, for example, a fast Fourier transform (FFT), to generate a subcarrier component, and may estimate the speed based on the result of calculation of a channel estimated value from a pilot signal.

Figure 6:
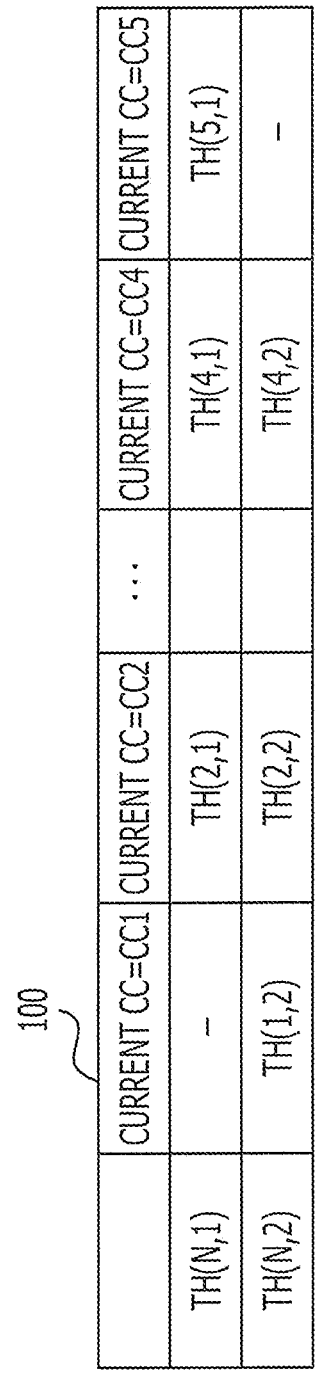
FIG. 6 illustrates an example of a threshold transformation table.

FIG. 6 illustrates an example of a threshold transformation table 100. The threshold transformation table 100 stores a plurality of records in each of which a predetermined speed threshold determined for each carrier is stored. Here, records of an item "TH (N, 1)" are records that are referred to when the carrier selection control unit 13 makes a switch from a carrier having a high center frequency to a carrier having a low center frequency. In contrast, records of an item "TH (N, 2)" are records that are referred to when the carrier selection control unit 13 makes a switch from a carrier having a low center frequency to a carrier having a high center frequency. A predetermined speed threshold associated with the first carrier is stored in an item "current CC=CC1". Likewise, predetermined speed thresholds associated with the second carrier, the third carrier, the fourth carrier, and the fifth carrier are stored in an item "current CC=CC2", an item "current CC=CC3", an item "current CC=CC4", and an item "current CC=CC5". Note that, here, information is not stored in the item "current CC=CC1" of records of the item "TH (N, 1)". This is because the first carrier is a carrier having the lowest center frequency among carriers received by the reception unit 11, and it is impossible for the carrier selection control unit 13 to make a switch to a carrier having a lower center frequency than the first carrier. Likewise, information is also not stored in the item "current CC=CC5" of records of the item "TH (N, 2)". This is because the fifth carrier is a carrier having the highest center frequency among carriers received by the reception unit 11, and it is impossible for the carrier selection control unit 13 to make a switch to a carrier having a higher center frequency than the fifth carrier.

Figure 7:
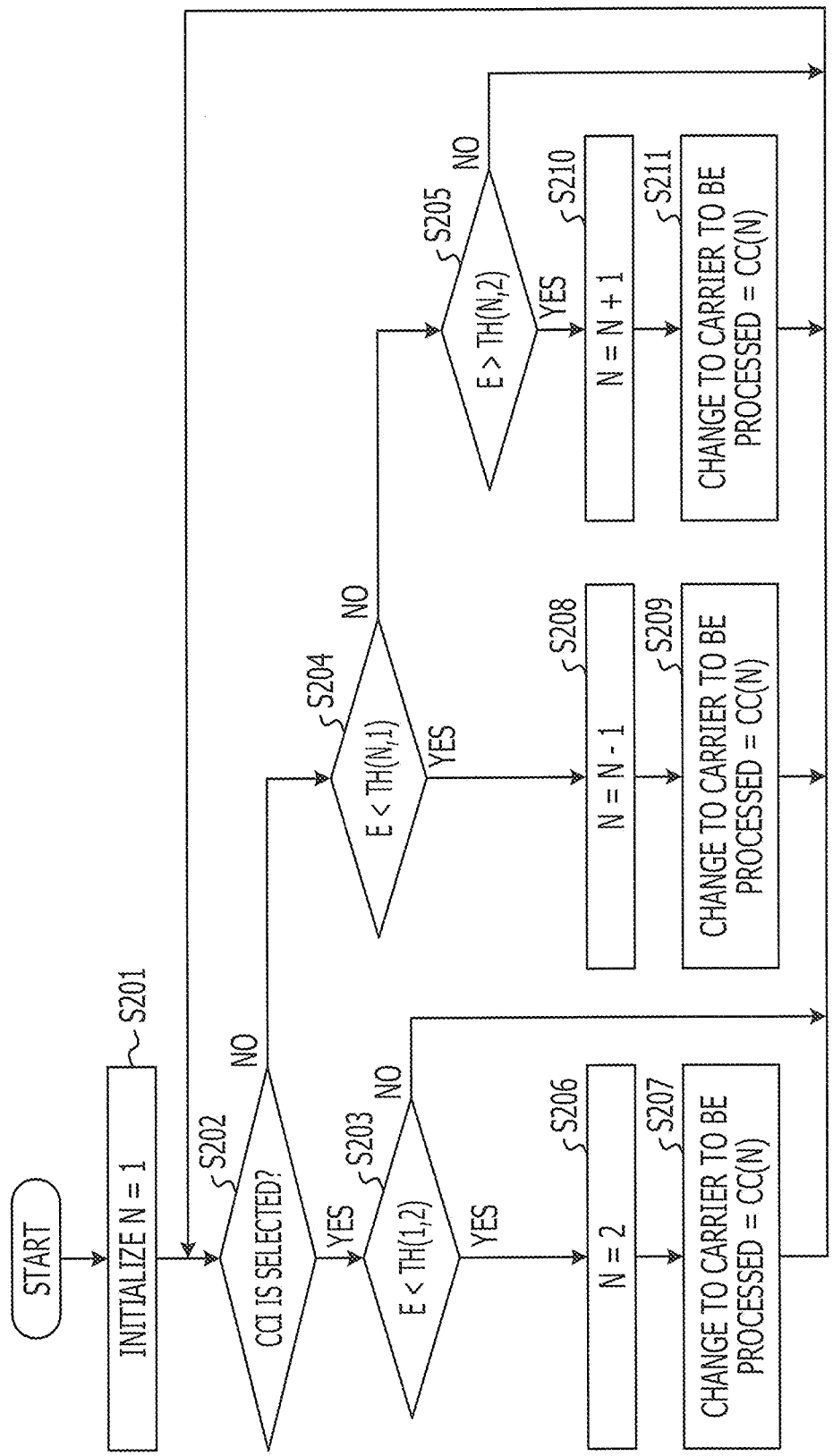
FIG. 7 is an example of a flowchart for explaining speed estimation operations of a reception system of a mobile terminal according to the second embodiment.

FIG. 7 is an example of a flowchart for explaining speed estimation operations of a reception system of a mobile terminal according to the second embodiment.

In step S201, the carrier selection control unit 13 initializes a setting as to which of a plurality of carriers is to be selected. Specifically, the value of N is set to be 1. Through this initial setting, the carrier selection control unit 13 establishes a setting for selecting the first carrier. Note that the setting condition is not limited to this.

In step S202, the carrier selection control unit 13 determines whether the first carrier is set as a carrier to be processed. If the first carrier is set (step S202: YES), the process proceeds to step S203. Otherwise, if the first carrier is not set, the process proceeds to step S204 (step S202: NO).

In step S203, the carrier selection control unit 13 determines whether the result of speed estimation output by the speed estimation unit 14 is smaller than a value stored in an item "TH (1, 2)" of the threshold transformation table 100. Specifically, the carrier selection control unit 13 outputs a reception signal for the first carrier, of reception signals for the first carrier and the second carrier received by the reception units 11 (11-1) and 11 (11-2), to the speed estimation unit 14. The speed estimation unit 14 estimates a Doppler frequency from the time-varying amount of a pilot signal of that reception signal, and estimates the speed from the estimated Doppler frequency and the center frequency of the first carrier. Then, the speed estimation unit 14 outputs the result of the performed speed estimation to the carrier selection control unit 13. The carrier selection control unit 13 refers to a record in the item "TH (1, 2)" of the threshold transformation table 100, and reads a value stored in the item "TH (1, 2)" of the record to which the carrier selection control unit 13 has referred. Then, the carrier selection control unit 13 determines whether the result of that speed estimation is smaller than the value stored in the item "TH (1, 2)". If the result of speed estimation is smaller than the value stored in the item "TH (1, 2)" (step S203: YES), the process proceeds to step S206. Otherwise, if the result of speed estimation is not smaller than the value stored in the item "TH (1, 2)" (step S203: NO), the process proceeds to step S202.

In step S204, the carrier selection control unit 13 determines whether the result of speed estimation output by the speed estimation unit 14 is smaller than a value stored in an item "TH (N, 1)" of the threshold transformation table 100. Specifically, the carrier selection control unit 13 outputs a reception signal for the first carrier, of reception signals for the first carrier and the second carrier received by the reception units 11 (11-1) and 11 (11-2), to the speed estimation unit 14. The speed estimation unit 14 estimates a Doppler frequency from the time-varying amount of a pilot signal of that reception signal, and estimates the speed from the estimated Doppler frequency and the center frequency of the first carrier. Then, the speed estimation unit 14 outputs the result of the performed speed estimation to the carrier selection control unit 13. The carrier selection control unit 13 refers to a record in the item "TH (N, 1)" of the threshold transformation table 100, and reads a value stored in the item "TH (N, 1)" of the record to which the carrier selection control unit 13 has referred. Then, the carrier selection control unit 13 determines whether the result of that speed estimation is smaller than the value stored in the item "TH (N, 1)". If the result of speed estimation is smaller than the value stored in the item "TH (N, 1)" (step S204: YES), the process proceeds to step S208. Otherwise, if the result of speed estimation is not smaller than the value stored in the item "TH (N, 1)" (step S204: NO), the process proceeds to step S205.

In step S205, the carrier selection control unit 13 determines whether the result of speed estimation output by the speed estimation unit 14 is larger than a value stored in an item "TH (N, 2)" of the threshold transformation table 100. Specifically, the carrier selection control unit 13 outputs a reception signal for the first carrier, of reception signals for the first carrier and the second carrier received by the reception units 11 (11-1) and 11 (11-2), to the speed estimation unit 14. The speed estimation unit 14 estimates a Doppler frequency from the time-varying amount of a pilot signal of that reception signal, and estimates the speed from the estimated Doppler frequency and the center frequency of the first carrier. Then, the speed estimation unit 14 outputs the result of the performed speed estimation to the carrier selection control unit 13. The carrier selection control unit 13 refers to a record in the item "TH (N, 2)" of the threshold transformation table 100, and reads a value stored in the item "TH (N, 2)" of the record to which the carrier selection control unit 13 has referred. Then, the carrier selection control unit 13 determines whether the result of that speed estimation is larger than the value stored in the item "TH (N, 2)". If the result of speed estimation is larger than the value stored in the item "TH (N, 2)" (step S205: YES), the process proceeds to step S210. Otherwise, if the result of speed estimation is not larger than the value stored in the item "TH (N, 2)" (step S205: NO), the process proceeds to step S202.

In step S206, the carrier selection control unit 13 sets the value of N to be 2.

In step S207, the carrier selection control unit 13 changes the carrier to be processed to the second carrier. Note that, after completion of the operation of step S207, the process proceeds to step S202.

In step S208, the value of N is decremented.

In step S209, the carrier selection control unit 13 changes the carrier to be processed to an Nth carrier. Note that, after completion of the operation of step S209, the process proceeds to step S202.

In step S210, the value of N is incremented.

In step S211, the carrier selection control unit 13 changes the carrier to be processed to the Nth carrier. Note that, after completion of the operation of step S211, the process proceeds to step S202.

In this way, in a mobile terminal that performs wireless communication using a plurality of carriers of different bandwidths, two or more carriers are received, a speed is estimated based on a first carrier of the two or more carriers received, it is determined whether the estimated speed is larger than a speed threshold associated with the first carrier, and, according to the result of the determining, the speed is estimated based on a second carrier different from the first carrier, so that the moving speed of the mobile terminal may be measured with good accuracy even when communication is performed using two or more carriers. Thereby, the Doppler-shifted frequency of radio waves from a handover-destination base station may be calculated. That is, whether to permit handover may be determined in advance, and an action for tracking a Doppler-shifted frequency after handover may be taken.

Third Embodiment

Next, a third embodiment of the present disclosure will be described. In the third embodiment, unlike the first embodiment and the second embodiment, the mobile terminal does not select a carrier to be used for speed estimation from a plurality of carriers. In the third embodiment, the mobile terminal estimates speeds based on received carriers, and estimates the speed of the mobile terminal based on the estimated speeds. Note that the configuration of the mobile terminal according to the third embodiment is the same as that of the mobile terminal according to the first embodiment illustrated in FIG. 1.

Figure 8:
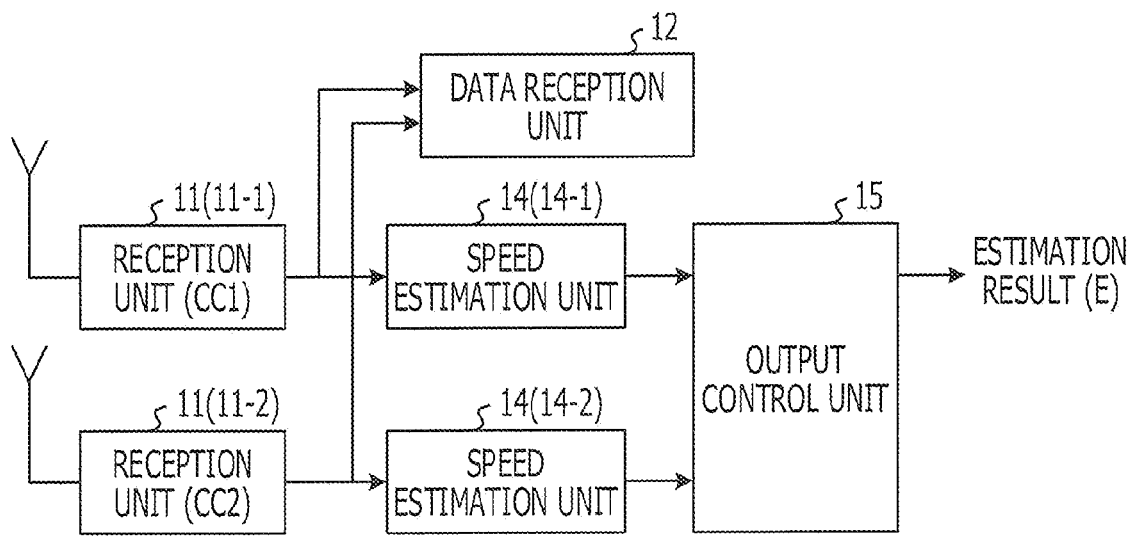
FIG. 8 is a block diagram illustrating functional blocks of a reception system of the mobile terminal according to a third embodiment.

FIG. 8 is a block diagram illustrating functional blocks of a reception system of the mobile terminal according to the third embodiment.

The reception system of the mobile terminal according to the present disclosure includes reception units 11 (11-1) and 11 (11-2), the data reception unit 12, the carrier selection control unit 13, the speed estimation units 14, and an output control unit 15.

The reception units 11 (11-1) and 11 (11-2) are functional units that receive a plurality of carriers having different center frequencies by using wireless antennas, and each of the reception units 11 (11-1) and 11 (11-2) is implemented by the antenna 1, the wireless device 2, the storage device 4, and the processor 7. The reception unit 11 (11-1) performs down-conversion of a received carrier to convert the carrier to digital signals, and outputs reception signals to the data receiving unit 12 and to the speed estimation unit 14 (14-1). Also, the reception unit 11 (11-2) performs down-conversion of a received carrier to convert the carrier to digital signals, and outputs reception signals to the data receiving unit 12 and to the speed estimation unit 14 (14-2).

In the description given below, the reception unit 11 (11-1) is assumed to receive a first carrier having a center frequency F1, and the reception unit 11 (11-2) is assumed to receive the second carrier having a center frequency F2. The reception units 11 (11-1) and 11 (11-2) both have the same function, and either one of the reception units 1 (11-1) and 11 (11-2) is referred to as the reception unit 11. Note that it is assumed hereinafter that the center frequency F2 is higher than the center frequency F1. Note that the number of carriers received is not limited to this. The data reception unit 12 is a functional unit that processes data received by the reception units 11 (11-1) and 11 (11-2), and is implemented by the storage device 4 and the processor 7.

The speed estimation unit 14 (14-1) performs speed estimation using reception signals output by the reception unit 11 (11-1). The speed estimation unit 14 (14-1) is a functional unit that outputs the result of speed estimation to be output, to the output control unit 15, and is implemented by the storage device 4 and the processor 7.

The speed estimation unit 14 (14-2) is a functional unit that performs speed estimation using reception signals output by the reception unit 11 (11-2), and is implemented by the storage device 4 and the processor 7. The speed estimation unit 14 (14-2) outputs the result of speed estimation to be output, to the output control unit 15. Note that the speed estimation units 14 (14-1) and 14 (14-2) may perform a time frequency transformation, for example, a fast Fourier transform (FFT), to generate a subcarrier component, and may estimate the speed based on the result of calculation of a channel estimated value from a pilot signal.

The output control unit 15 is a functional unit that receives results of speed estimation from the speed estimation unit 14 (14-1) and the speed estimation unit 14 (14-2), and is implemented by the storage device 4 and the processor 7. Based on the received results, the output control unit 15 outputs the result of final speed estimation.

Figure 9:
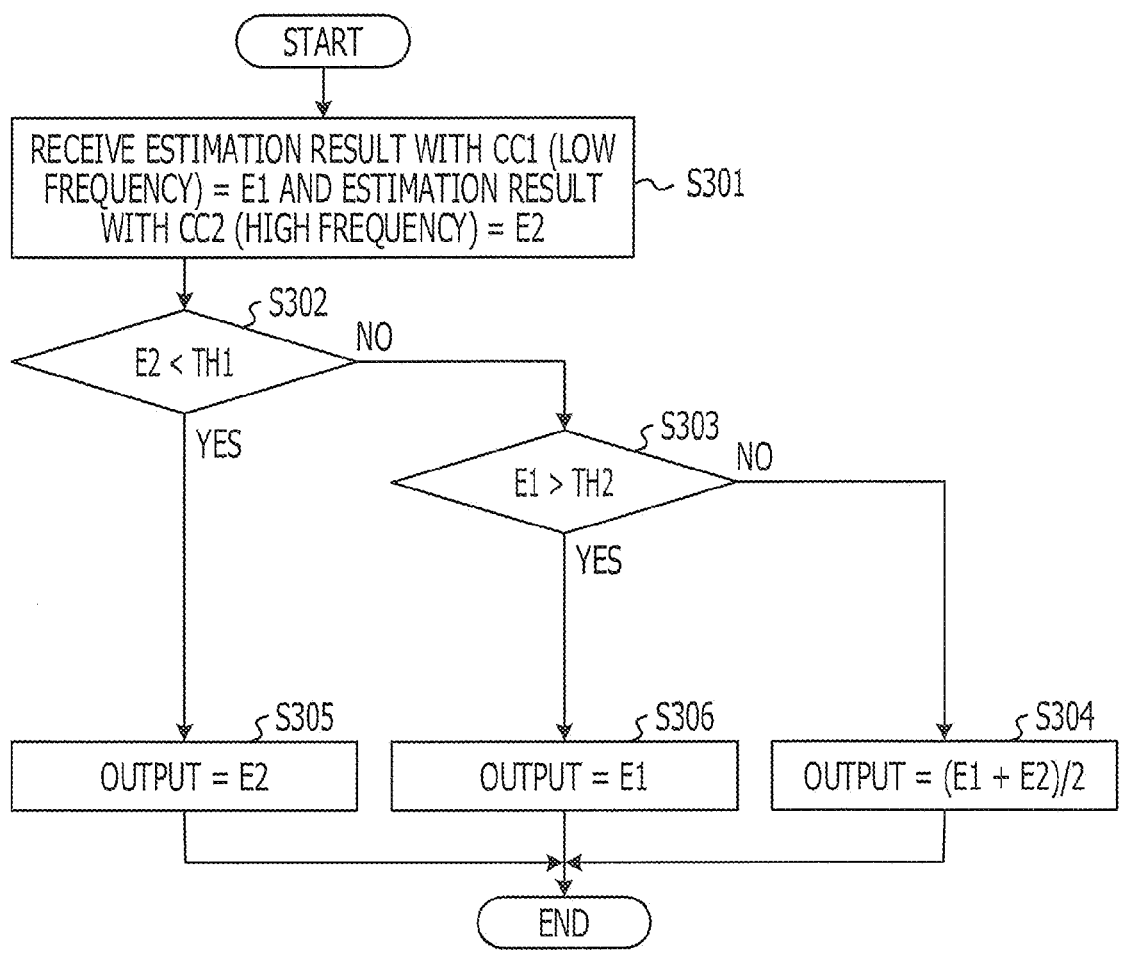
FIG. 9 is an example of a flowchart for explaining speed estimation operations of a reception system of a mobile terminal according to the third embodiment.

FIG. 9 is an example of a flowchart for explaining speed estimation operations of a reception system of a mobile terminal according to the third embodiment.

In step S301, the output control unit 15 receives a first speed estimation result output from the speed estimation unit 14 (14-1) and a second speed estimation result output from the speed estimation unit 14 (14-2). Specifically, the reception unit 11 (11-1) performs down-conversion of a received first carrier to convert the carrier to digital signals, and outputs reception signals to the speed estimation unit 14 (14-1). Then, the speed estimation unit 14 (14-1) generates a first speed estimation result based on the reception signals for the first carrier, and outputs it to the output control unit 15. Likewise, the reception unit 11 (11-2) performs down-conversion of a received second carrier to convert the carrier to digital signals, and outputs reception signals to the speed estimation unit 14 (14-2). Then, the speed estimation unit 14 (14-2) generates a second speed estimation result based on the reception signals for the second carrier, and outputs it to the output control unit 15.

In step S302, the output control unit 15 determines whether the second speed estimation result is smaller than a first threshold that is determined in association with the second carrier. If the second speed estimation result is smaller than the first threshold (step S302: YES), the process proceeds to step S305. Otherwise, if the second speed estimation result is not smaller than the first threshold (step S302: NO), the process proceeds to step S303.

In step S303, the output control unit 15 determines whether the first speed estimation result is larger than a second threshold that is determined in association with the first carrier. If the first speed estimation result is larger than the second threshold (step S303: YES), the process proceeds to step S306. Otherwise, if the first speed estimation result is not larger than the second threshold (step S303: NO), the process proceeds to step S304.

In step S305, the output control unit 15 outputs the second speed estimation result as a speed estimation result.

In step S306, the output control unit 15 outputs the first speed estimation result as a speed estimation result.

In step S304, the output control unit 15 calculates the average speed of the first speed estimation result and the second speed estimation result, as a speed estimation result, and outputs the calculated speed as a speed estimation result.

In this way, at least two or more carriers are received, a first speed based on a first carrier, of the two or more carriers received, and a second speed based on a second carrier different from the first carrier are estimated, and if the estimated first speed and second speed are within a predetermined speed range defined based on both the first carrier and the second carrier, the average speed of the first speed and the second speed is output, so that the accuracy of the finally output result for the moving speed may be improved. Thereby, the Doppler-shifted frequency of radio waves from a handover-destination base station may be calculated. That is, whether to permit handover may be determined in advance. Also, an action for tracking a Doppler-shifted frequency after handover may be taken.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal comprising:
a memory; and
a processor coupled to the memory and configured to:
receive two or more of component carriers of different bandwidths, the component carriers being used for wireless communication performed by the mobile terminal,
estimate one or more speeds of the mobile terminal based on respective one or more carriers among the two or more of the component carriers,
determine whether the estimated one or more speeds satisfy a given condition, and estimate a speed of the mobile terminal according to a result of the determining, wherein estimate a first speed based on a first carrier among the received two or more of the component carriers, determine whether the first speed is larger than a given threshold associated with the first carrier, estimate, according to the result of the determining, the speed of the mobile terminal based on a second carrier different from the first carrier among the received two or more of the component carriers, estimate, when the processor determines the first speed is larger than the given threshold, the speed of the mobile terminal based on a center frequency of the second carrier having a frequency lower than the center frequency of the first carrier, and estimate, when the processor determines the first speed is smaller than the given threshold, the speed of the mobile terminal based on a center frequency of the second carrier having a frequency higher than the center frequency of the first carrier.

2. The mobile terminal according to claim 1, wherein the given threshold is defined based on a frequency resolution at a center frequency of each of the component carriers.

3. The mobile terminal according to claim 1, wherein the processor is configured to:

estimate a second speed of the mobile terminal based on the second carrier different from the first carrier among the received two or more of the component carriers; and output, as the estimated speed of the mobile terminal, an average speed of the first speed and the second speed when the processor determines that the first speed is within a given first range defined based on the first carrier and that the second speed is within a given second range defined based on the second carrier.

4. The mobile terminal according to claim 1, wherein the first speed of the mobile terminal are estimated based on a Doppler frequency of the first carrier, when the processor determines the first speed is larger than the given threshold, the speed of the mobile terminal is estimated based on a Doppler frequency of the second carrier having a frequency lower than the center frequency of the first carrier, and when the processor determines the first speed is smaller than the given threshold, the speed of the mobile terminal is estimated based on a Doppler frequency of the second carrier having a frequency higher than the center frequency of the first carrier.

5. A speed estimation method comprising:

receiving at a mobile terminal, two or more of the component carriers of different bandwidths, the component carriers being used for wireless communication performed by the mobile terminal;

estimating one or more speeds of the mobile terminal based on respective one or more carriers among the two or more of the component carriers;

determining whether the estimated one or more speeds satisfy a given condition; and estimating, by a processor, a speed of the mobile terminal according to a result of the determining;

wherein the estimating the one or more speeds estimates a first speed based on a first carrier among the received two or more of the component carriers, the determining determines whether the first speed is larger than a given threshold associated with the first carrier, the estimating the speed estimates, according to the result of the determining, the speed of the mobile terminal based on a second carrier different from the first carrier among the received two or more of the component carriers;

the estimating the speed estimates, when the processor determines the first speed is larger than the given threshold, the speed of the mobile terminal based on a center frequency of the second carrier having a frequency lower than the center frequency of the first carrier, and the estimating the speed estimates, when the processor determines the first speed is smaller than the given threshold, the speed of the mobile terminal based on a center frequency of the second carrier having a frequency higher than the center frequency of the first carrier.

6. The speed estimation method according to claim 5, wherein the estimating the one or more speeds estimates a second speed of the mobile terminal based on the second carrier different from the first carrier among the received two or more of the component carriers, and the estimating the speed outputs, as the estimated speed of the mobile terminal, an average speed of the first speed and the second speed when the processor determines that the first speed is within a given first range defined based on the first carrier and that the second speed is within a given second range defined based on the second carrier.

7. A non-transitory computer-readable storage medium having stored therein a speed estimation program of a mobile terminal, the speed estimation program causing the mobile terminal to execute a procedure comprising:

receiving two or more of the component carriers of different bandwidths, the component carriers being used for wireless communication performed by the mobile terminal;

estimating one or more speeds of the mobile terminal based on respective one or more carriers among the two or more of the component carriers;

determining whether the estimated one or more speeds satisfy a given condition; and estimating a speed of the mobile terminal according to a result of the determining;

wherein the estimating the one or more speeds estimates a first speed based on a first carrier among the received two or more of the component carriers, the determining determines whether the first speed is larger than a given threshold associated with the first carrier, the estimating the speed estimates, according to the result of the determining, the speed of the mobile terminal based on a second carrier different from the first carrier among the received two or more of the component carriers;

the estimating the speed estimates, when the processor determines the first speed is larger than the given threshold, the speed of the mobile terminal based on a center frequency of the second carrier having a frequency lower than the center frequency of the first carrier, and the estimating the speed estimates, when the processor determines the first speed is smaller than the given threshold, the speed of the mobile terminal based on a center frequency of the second carrier having a frequency higher than the center frequency of the first carrier.

8. The non-transitory computer-readable storage medium according to claim 7, the estimating the one or more speeds estimates a second speed of the mobile terminal based on the second carrier different from the first carrier among the received two or more of the component carriers, and the estimating the speed outputs, as the estimated speed of the mobile terminal, an average speed of the first speed and the second speed when the processor determines that the first speed is within a given first range defined based on the first carrier and that the second speed is within a given second range defined based on the second carrier.

\* \* \* \* \*